United States Patent [19]
Oelke

[11] 4,344,629
[45] Aug. 17, 1982

[54] SELF-LAPPING HIGH SPEED SEAL WITH WEAR-IN LIP

[75] Inventor: Erwin S. Oelke, Cypress, Calif.

[73] Assignee: Smith International, Inc., Newport Beach, Calif.

[21] Appl. No.: 196,990

[22] Filed: Oct. 14, 1980

[51] Int. Cl.³ .................... F16J 15/34; F16C 33/78; E21B 10/08
[52] U.S. Cl. .................................. 277/1; 277/84; 277/92; 277/95; 175/371; 308/8.2
[58] Field of Search ............... 277/1, 9.5, 12, 32, 277/81 R, 83–85, 92, 95, 96, 96.1, 166, 96.2; 175/371; 308/8.2

[56] References Cited
U.S. PATENT DOCUMENTS

| | | | |
|---|---|---|---|
| 2,599,034 | 6/1952 | Wilkinson | 277/92 X |
| 2,881,015 | 4/1959 | Wahl | 277/1 X |
| 3,022,081 | 2/1962 | Kosatka | 277/84 X |
| 3,381,968 | 5/1968 | Neilson | 277/95 |
| 3,489,421 | 1/1970 | Neilson | 277/95 |
| 3,862,762 | 1/1975 | Millsap | 277/92 |
| 3,944,306 | 3/1976 | Neilson | 308/8.2 X |

Primary Examiner—Robert S. Ward, Jr.
Attorney, Agent, or Firm—Robert G. Upton

[57] ABSTRACT

The high speed seal is an integral metal-to-metal type seal that, in its initial application, acts as a regular resilient O-ring. As the seal begins to operate, a protruding circular resilient lip adjacent the metal sealing ring provides an initial seal and, as the seal continues to function over a length of time, the resilient portion wears away and metal-to-metal contact begins to be made. Thus the seal gradually converts from a standard O-ring type of seal to a lapped-in metal-to-metal seal during operation of the bit.

10 Claims, 2 Drawing Figures

SELF-LAPPING HIGH SPEED SEAL WITH WEAR-IN LIP

BACKGROUND OF THE INVENTION

1. Field of the Invention

This invention relates to a high speed seal for a rock bit.

More particularly, this invention relates to a high speed metal-to-metal seal for a rock bit that initially provides a resilient rubberlike O-ring seal during the early running of the bit and, as the seal wears, the seal becomes a metal-to-metal seal as the bit continues to run in a borehole.

2. Description of the Prior Art

There are many prior art patents that describe composite seals that are made up of resilient material that encapsulates or is adjacent to a metal sealing ring or the like. For example, U.S. Pat. No. 3,381,968, assigned to the same assignee as the present invention, describes and teaches one or more belleville type of rings encapsulated within a resilient sealing material with mating surfaces that contact both the leg of a rock bit surrounding a journal pin and a cone mounted on the journal pin. The belleville spring provides a means to accommodate for irregularities associated with the cone rotating on the journal pin. There is no metal-to-metal sealing contact as taught in the present invention.

The present invention initially serves as an ordinary O-ring and progresses towards a metal-to-metal seal as the half-round rubberized portion wears off, allowing the metal portion of the seal to gradually seat into the bearing surface of the opposing cone or leg portion of a rock bit.

U.S. Pat. No. 3,761,145 describes a metal-to-metal seal with an oval-shaped O-ring positioned adjacent a metal sealing ring. The O-ring serves to urge the sealing ring into metal-to-metal contact with an adjacent cone of a rock bit. A portion of the journal supporting the cone nearest the bearing surface is conical in shape, thus biasing the oval-shaped O-ring against the metal-to-metal sealing ring. The O-ring forces the sealing surface of the ring into contact with the bearing surface of the cone. This patent is disadvantaged in that the metal-to-metal seal must be lapped-in before the rock bit is operational. Otherwise lubricant from within the bearing surfaces can escape by the sealing surface before the metal-to-metal surfaces are adequately seated. Once lubricant escapes from the bearing surfaces of a rock bit, the operating life of the rock bit is considerably shortened in that the bearings easily become overheated and will fail due to lack of lubricant in the bearing.

The present invention substantially eliminates any tendency to lose lubricating grease from within a roller cone. Upon initial actuation or operation of the bit the seal acts as an ordinary resilient O-ring and, as the cone continues to rotate on its journal, the protruding rubber portion of the seal adjacent the bearing surface of the cone wears away, gradually allowing the metal sealing face of the seal to lap into sealing engagement with adjacent sealing surfaces on a cone or a journal of a rock bit. Thus little or no lubricant can escape past the seal due to the fact that the rubber portion of the seal prevents this from happening.

SUMMARY OF THE INVENTION

An object of this invention is to provide a metal-to-metal seal that prevents egress of lubricant from within a rock bit while the metal-to-metal surfaces gradually become lapped into sealing engagement during operation of the rock bit.

Yet another object of this invention is to encapsulate, into a single composite unit, a metal ring in resilient material. The rubberlike material acts as an O-ring type of seal while the metal-to-metal surfaces gradually lap themselves into sealing engagement.

Still another object of the invention is the elimination of the need for expensive and time-consuming pre-lapped metal-to-metal surfaces necessary with metal-to-metal seals where there is no initial protection from lubricant leakage, such as that taught in the instant invention.

A seal apparatus for a rock bit is disclosed. The seal is positioned in a cavity formed between a leg of the rock bit, the leg having a journal extending therefrom and a rotatable cone mounted on the journal. The metal consists of a metal ring. The ring has a diameter that will fit within the cavity. A peripheral surface formed by the ring subsequently serves as part of a metal-to-metal seal.

A resilient material partially encapsulates the metal ring. The resilient material forms an O-ring type of seal in the cavity formed between the leg of the rock bit and the rotatable cone during initial rotation of the cone on the journal. A portion of the resilient material nearest the metal peripheral surface eventually wears away, exposing the peripheral metal surface to an adjacent cavity wall. The metal surface and the cavity wall subsequently form a lapped sealing surface. The resilient sealing material prevents loss of a lubricant stored within the rock bit during the time the peripheral surface of the metal ring is forming a lapped seal against the adjacent wall of the cavity.

An advantage over the prior art is the ability to protect a rock bit from lubricant leakage while lapping in adjacent metal-to-metal sealing surfaces.

Yet another advantage over the prior art is the integral combination seal where a rubberlike O-ring material substantially encapsulates a metal ring having an exposed rubbing surface that is allowed to lap into an adjacent surface while the resilient ring-covering material resists leakage of a lubricant past the seal.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
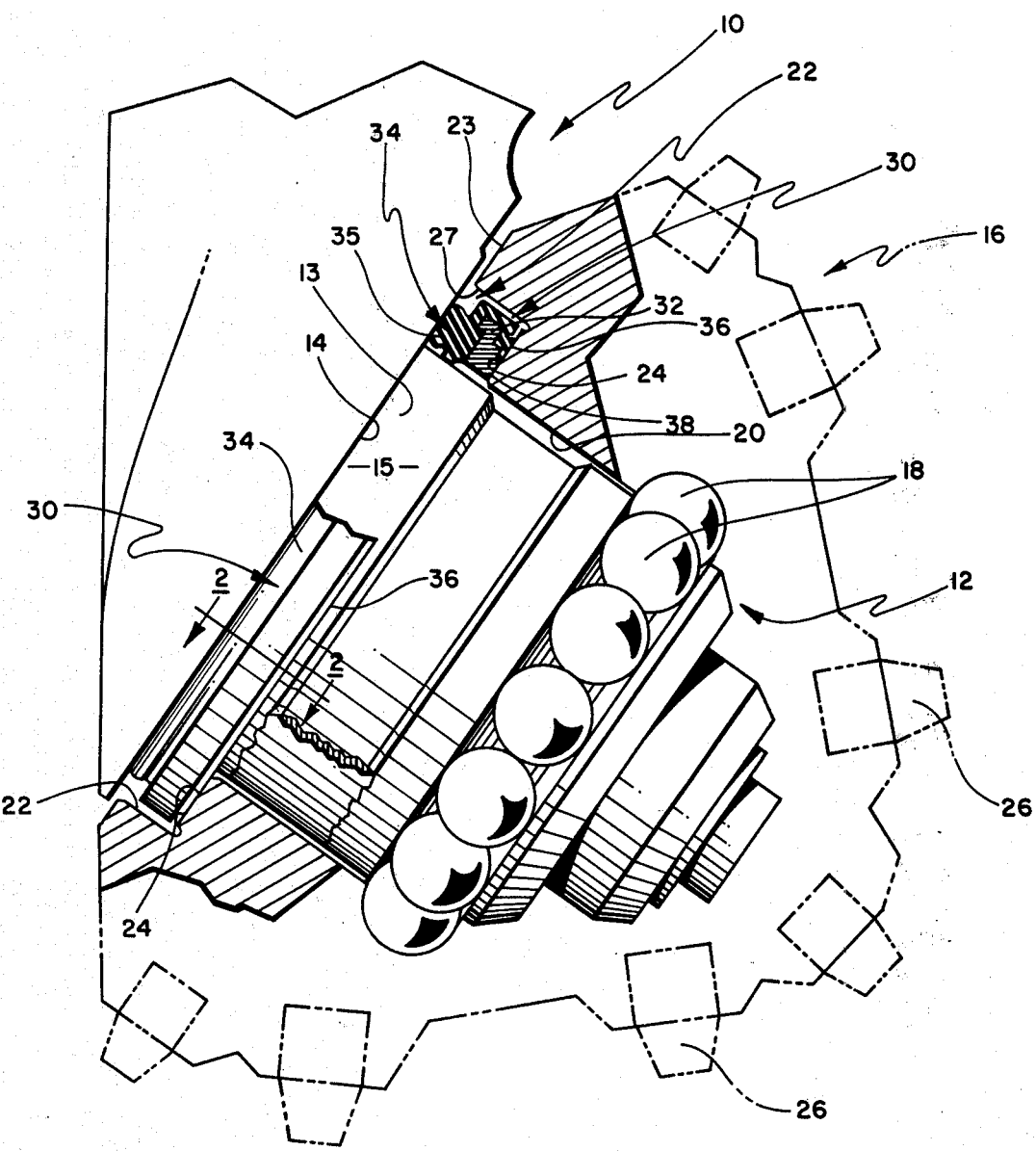
FIG. 1 is a partially broken away, partially in phantom line, cross section of the preferred embodiment of the invention.

Turning now to FIG. 1, a leg, generally designated as 10, of a typical multi-cone rock bit has a journal bearing 12 extending therefrom. At the base 13 of the journal 12 is a leg backface 14 machined into leg 10. A cone cutter 16 with, for example, multiple inserts 26 interference fitted therein, mounts onto the journal 12. The cone is retained by a multiplicity of thrust balls 18.

A seal cavity or recess 22 is preferably formed in the cone backface 23. A radially aligned bearing surface 24 is machined in the seal cavity 22.

Figure 2:
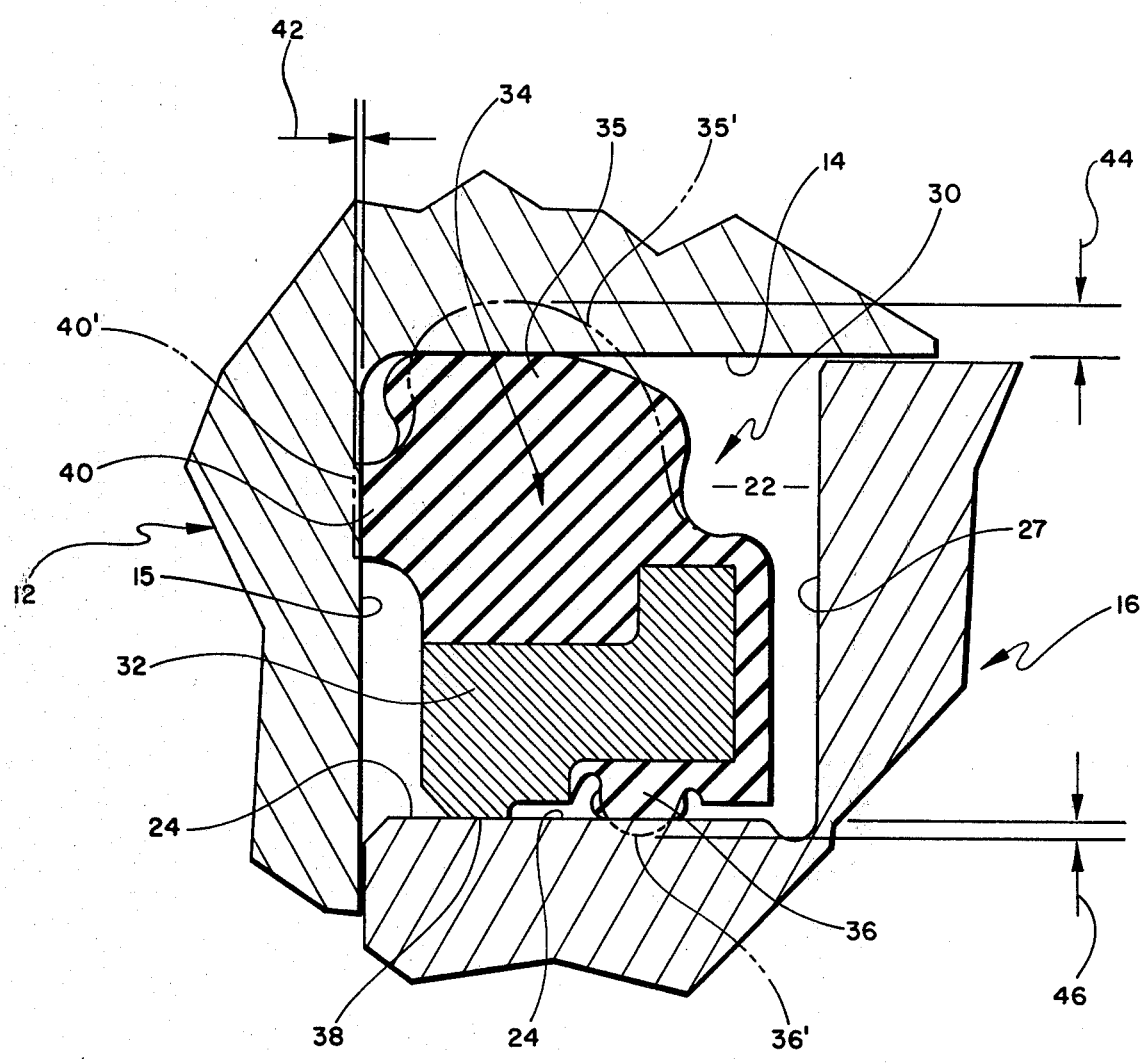
FIG. 2 is a view taken through 2—2 of FIG. 1 illustrating an enlarged cross section of the composite seal entrapped within a seal cavity.

A high speed seal, generally designated as 30, consists of a first outer resilient material 34 fabricated from a nitrile compound. An example of this compound (and a preferred resilient material for the high speed seal 30) is Gardena Rubber Compound 716-70, manufactured by Gardena Rubber Co., Inc., Gardena, Calif. This rubber-like material substantially encapsulates a metal ring 32. A peripheral sealing surface 38, defined by the ring 32, is substantially exposed to bearing surface 24 in seal cavity 22 (FIG. 2). The resilient portion 34 of the seal is shaped in a mold to be slightly compressed within seal cavity 22. The seal cavity 22 is defined by the axially aligned cavity wall 27, radially aligned bearing surface 24, journal bearing surface 15 and the leg backface 14.

With reference now to FIG. 2, the portion of the seal 35 of the resilient material 34 contacting the leg backface 14 is semicircular in shape and acts like an O-ring when compressed against backface 14. An inner portion 40 of resilient material 34 contacts the journal bearing surface 15 and is also under compression. Another portion of the seal 36, formed from the material 34, serves a very important function. This semicircular protrusion 36 is positioned radially outwardly and is concentric with the metal peripheral lip 38 of ring 32. The O-ring like annular protrusion is compressed against the radially machined recessed surface 24. Since the composite seal 30 is compressed within the seal cavity 22, the seal 30 initially acts as an O-ring seal. The resilient portion of the seal is compressed at seal portions 35, 36 and 40. The amount of compression is indicated by distances 44, 46 and 42. The composite seal 30, in its uncompressed state, is indicated in phantom at 35', 36' and 40'.

During operation of the rock bit the composite seal acts as an O-ring with the protruding surface 36 providing the primary seal while the metal peripheral surface 38 laps itself into sealing engagement with the radially machined adjacent surface 24. Continued operation of the rock bit in a borehole will gradually wear away or abrade the protruding semicircular seal portion 36 as the metal-to-metal seal becomes more effective. Hence, lubricant from within the bit cannot escape past the resilient lip 36 while the unlapped metal-to-metal surfaces 24 and 38 work themselves into sealing engagement with one another during initial operation of the bit. It is obvious then that an expensive and time-consuming lapping operation is substantially eliminated during the fabrication of a sealed rock bit. The seal of the instant invention is self-lapping while operating efficiently within a borehole.

The preferred metal material of ring 32 is a low carbon metal, such as 1018 steel, with a hard metal spray coating, such as Chromium Oxide Silica Metco 136SF. This hard metal spray coat is about ten-thousandths of an inch thick. Other suitable hard metal spray coating would be Tungsten Carbide Metco 73-FNS-1 or Aluminum Oxide-Titanium Dioxide Metco 130SF.

The ring 32 may be fabricated from Carbon Graphite P-658RC or Silicon Carbide PE-8148 without departing from the teachings of this invention.

It would be obvious to provide the self-lapping seal for any bearing assembly where retention of internal lubricant is essential during the self-lapping process.

It would be obvious to fabricate the ring in slightly different configurations to accommodate different sizes and shapes of seal cavities.

It would also be obvious to utilize an axially aligned surface as a lapping surface for the metal-to-metal seal contact.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A seal apparatus for a rock bit, said seal being positioned in a cavity formed between a leg of said rock bit, said leg having a journal extending therefrom, and a rotatable cone mounted on said journal, said seal comprising:

a metal ring, said ring having a diameter that will fit within said cavity, a peripheral surface formed by said ring subsequently serving as part of a metal-to-metal seal, a resilient material partially encapsulating said metal ring, said resilient material forming an O-ring type of seal in said cavity formed between said leg of said rock bit and said rotatable cone, during initial rotation of said cone on said journal, a portion of said resilient material nearest said metal peripheral surface eventually wears away exposing said peripheral metal surface to an adjacent cavity wall, said metal surface and said cavity wall subsequently forming a lapped sealing surface, said resilient sealing material prevents loss of a lubricant stored within said rock bit during the time said peripheral surface of said metal ring is forming a lapped seal against said adjacent wall of said cavity.

2. The invention as set forth in claim 1 wherein the seal cavity is formed in the cone of said rock bit.

3. The invention as set forth in claim 2 wherein said wall of said cavity in said cone forming part of said metal-to-metal lapped seal is a radially extending machined surface.

4. The invention as set forth in claim 3 wherein said metal ring forming said peripheral surface is positioned with its peripheral surface adjacent to said radially extending wall of said cavity.

5. The invention as set forth in claim 1 wherein said resilient material encapsulating said metal ring is formed slightly larger than said cavity, said resilient material being slightly deformed under compression when inserted within the cavity.

6. The invention as set forth in claim 1 wherein said resilient material encapsulating said metal ring is a nitrile compound.

7. The invention as set forth in claim 1 wherein said metal ring is fabricated from a low carbon steel.

8. A method wherein a composite metal-to-metal seal is self-lapping, said seal being so configured to fit within a seal cavity formed by a bearing assembly, said seal retains lubricant surrounding bearing surfaces within said bearing assembly during the self-lapping process comprising the steps of:

encapsulating partially an annular metal ring within a resilient material, a peripheral surface formed by said ring subsequently serving as part of said self-lapping metal-to-metal seal, inserting said composite self-lapping seal within said seal cavity, a cross section of said seal is larger than a cross section of said seal cavity formed by said bearing assembly, said composite seal being under compression when inserted within said seal cavity, an annular portion of said resilient material adjacent to said peripheral surface of said metal ring is positioned concentric with and outside of said peripheral surface, said annular portion prevents egress of lubricant from said bearing surfaces while said peripheral surface of said ring laps itself against an adjacent wall of said seal cavity, and abrading away gradually of said annular resilient material adjacent said metal peripheral surface as the metal-to-metal surfaces lap themselves into sealing engagement, one with the other, thereby providing a resilient seal subsequent to a lapped metal-to-metal seal during operation of said bearing assembly.

9. The method as set forth in claim 8 further comprising the step of inserting said composite self-lapping seal within a rock bit.

10. The method as set forth in claim 9 further comprising the steps of:

forming a seal cavity in a cone of said rock bit, said seal cavity being substantially closed when said cone is mounted on a journal extending from a leg of said rock bit, inserting said composite seal under compression into said seal cavity prior to mounting said cone onto said journal, and abrading a portion of said composite seal, said seal portion being concentric with and surrounding said peripheral metal surface of said ring as said peripheral surface laps itself into sealing engagement with an adjacent surface defining said seal cavity thus substantially eliminating egress of lubricant from within said rock bit during the self-lapping process.

* * * * *

UNITED STATES PATENT AND TRADEMARK OFFICE
CERTIFICATE OF CORRECTION

PATENT NO. : 4,344,629

DATED : August 17, 1982

INVENTOR(S) : Erwin S. Oelke

It is certified that error appears in the above-identified patent and that said Letters Patent is hereby corrected as shown below:

Column 2, line 18, "metal" should read -- seal --

Column 3, line 54, "metal" should read -- steel --

Signed and Sealed this

Twenty-third Day of November 1982

[SEAL]

Attest:

GERALD J. MOSSINGHOFF

Attesting Officer     Commissioner of Patents and Trademarks